(12) United States Patent
Yu et al.

(10) Patent No.: US 8,982,303 B2
(45) Date of Patent: Mar. 17, 2015

(54) TRANSFLECTIVE LIQUID CRYSTAL DISPLAY AND METHOD THEREOF

(71) Applicant: HannStar Display Corporation, New Taipei (TW)

(72) Inventors: Chia-Hua Yu, New Taipei (TW); Hsien-Tang Hu, Taichung (TW); Ko-Ruey Jen, Taipei (TW); Jui-Chi Lai, Kaohsiung (TW)

(73) Assignee: HannStar Display Corporation, New Taipei (TW)

( * ) Notice: Subject to any disclaimer, the term of this patent is extended or adjusted under 35 U.S.C. 154(b) by 144 days.

(21) Appl. No.: 13/937,206

(22) Filed: Jul. 8, 2013

(65) Prior Publication Data

US 2014/0226099 A1    Aug. 14, 2014

(30) Foreign Application Priority Data

Feb. 8, 2013    (CN) .......................... 2013 1 0050894

(51) Int. Cl.
*G02F 1/1368* (2006.01)
*G02F 1/1343* (2006.01)
*G02F 1/1335* (2006.01)

(52) U.S. Cl.
CPC .... *G02F 1/133555* (2013.01); *G02F 1/134363* (2013.01)
USPC .......................................... 349/114; 349/141

(58) Field of Classification Search
CPC ..................... G02F 1/134363; G02F 1/133555
USPC ........ 349/43, 114, 139, 141, 187; 257/59, 72; 345/92; 438/30; 445/24
See application file for complete search history.

(56) References Cited

U.S. PATENT DOCUMENTS

| | | | |
|---|---|---|---|
| 2008/0068543 A1* | 3/2008 | Mitsui et al. | 349/114 |
| 2008/0151156 A1* | 6/2008 | Ino | 349/113 |
| 2008/0180613 A1* | 7/2008 | Matsumoto | 349/113 |
| 2009/0167998 A1* | 7/2009 | Park et al. | 349/114 |
| 2011/0032460 A1* | 2/2011 | Lee et al. | 349/114 |

* cited by examiner

*Primary Examiner* — Dung Nguyen
*Assistant Examiner* — Tai Duong
(74) *Attorney, Agent, or Firm* — CKC & Partners Co., Ltd.

(57) ABSTRACT

A transflective type liquid crystal display comprises a first substrate with a reflective region and a transmission region. A gate region, an insulation layer and a semiconductor layer are sequentially formed on the first substrate. The semiconductor layer has a source region, a drain region and a channel region. A first dielectric layer is disposed on the semiconductor layer and has a through hole to expose a part of the drain region. A first common electrode is disposed on the first dielectric layer and the through hole to cover the exposed part of the drain region. A reflective electrode is disposed on the first dielectric layer located in the reflective region. A second dielectric layer is disposed on the first common electrode and the reflective electrode. A pixel electrode is disposed on the second dielectric layer and connected to the drain region via the through hole.

10 Claims, 8 Drawing Sheets

TRANSFLECTIVE LIQUID CRYSTAL DISPLAY AND METHOD THEREOF

RELATED APPLICATIONS

This application claims priority to Chinese application no. 201310050894.0 filed Feb. 8, 2013, the entirety of which is incorporated herein by reference.

TECHNICAL FIELD

The present disclosure relates to a liquid crystal display, and more particularly to a transflective liquid crystal display.

BACKGROUND

Typically, there are three types of display methods associated with a liquid crystal display: a transmissive type display method, a reflective type display method and a transflective type display method.

In a transmissive type display method, a backlight module transmits light through the panel to display images. In other words, this type of liquid crystal display uses its own light source to provide light. With this configuration, however, when the ambient light is brighter than the light provided by the backlight module, the displayed images are not clear. In a reflective type display method, a reflective film is coated on the bottom glass substrate of the panel to reflect ambient light. The ambient light is used as a light source. In the case of this configuration, when the ambient light is dim, the displayed images are not clear.

A transflective type display method has been developed to resolve the above problems. The transflective type liquid crystal display has both transmissive type and reflective type characteristics. When the ambient light is strong, the transflective type liquid crystal display acts as a reflective type liquid crystal display and uses the ambient light to display images. When the ambient light is weak, on the other hand, the transflective type liquid crystal display acts as a transmissive type liquid crystal display and uses the backlight module to provide light to display images. Therefore, such a transflective type liquid crystal display may be used in conditions with different levels of ambient light. Today, the transflective type liquid crystal display is widely used in mobile phones and PDAs (personal digital assistants).

SUMMARY

The present invention discloses a transflective type liquid crystal display with a wide viewing angle.

The transflective type liquid crystal display comprises a thin film transistor disposed on a first substrate. The first substrate has a reflective region and a transmission region. The thin film transistor has a channel region, a source region, a drain region and a gate region. A first dielectric layer is disposed on the thin film transistor. The first dielectric layer has a through hole to expose a part of the drain region. A first common electrode is disposed on the first dielectric layer and the through hole to cover the exposed part of the drain region. A reflective electrode is disposed on the first dielectric layer located in the reflective region. A second dielectric layer is disposed on the first common electrode, the reflective electrode and the sidewalls of the through hole. A pixel electrode is disposed on the second dielectric layer located in the transmission region and reflective region. The pixel electrode is connected to the drain region via the through hole.

A first metal layer is disposed on the transmission region. An insulation layer is disposed on the first metal layer and the first substrate. A semiconductor layer is disposed on the insulation layer at a position of the insulation layer corresponding to the metal layer. The semiconductor layer includes the channel region, the source region and the drain region. The source region and the drain region are disposed on two sides of the channel region. The first metal layer includes the gate region.

In an embodiment, the transflective type liquid crystal display further comprises a second substrate facing the first substrate and a liquid crystal molecule layer disposed between the first substrate and the second substrate. A color resist layer is disposed on the second substrate. An opening is formed in the color resist layer at a position of the color resist layer corresponding to the reflective region.

In an embodiment, the first common electrode of the transflective type liquid crystal display is extended in the reflective region and the transmission region. The reflective electrode is disposed on the first common electrode located in the reflective region. The pixel electrode has a plurality of openings, so that a transverse electric field is generated between the pixel electrode and the first common electrode to drive the liquid crystal molecule layer in the transmission region and the reflective region.

In an embodiment, the second substrate of the transflective type liquid crystal display further comprises a second common electrode. The second common electrode is disposed on the color resist layer corresponding to the reflective region. The first common electrode is only disposed on the transmission region. The reflective electrode is disposed on the first dielectric layer in the reflective region and connected to the first common electrode. The pixel electrode in the transmission region has a plurality of openings, so that a transverse electric field is generated between the pixel electrode and the first common electrode to drive the liquid crystal molecule layer in the transmission region.

In an embodiment, an electric field is generated between the pixel electrode and the second common electrode to drive the liquid crystal molecule layer in the reflective region.

The present invention also provides a method for forming a transflective type liquid crystal display. The method comprises providing a first substrate with a reflective region and a transmission region; forming a thin film transistor in the transmission region, in which the thin film transistor has a channel region, a source region, a drain region and a gate region; forming a first dielectric layer on the thin film transistor, in which the first dielectric layer has a through hole to expose a part of the drain region; forming a first common electrode on the first dielectric layer and the through hole to cover the exposed part of the drain region; forming a reflective electrode on the first dielectric layer located in the reflective region; forming a second dielectric layer on the first common electrode, the reflective electrode and sidewalls of the through hole; and forming a pixel electrode on the second dielectric layer. The pixel electrode is connected to the drain region via the through hole.

Accordingly, an IPS mode liquid crystal display structure is adopted to form the transmission region. Therefore, a transverse electric field is generated between the pixel electrode and the first common electrode in the transmission region of the transflective type liquid crystal display, so that the viewing angle is enhanced.

BRIEF DESCRIPTION OF THE DRAWINGS

In order to make the foregoing as well as other aspects, features, advantages, and embodiments of the present disclosure more apparent, the accompanying drawings are described as follows.

DETAILED DESCRIPTION

Figure 1:
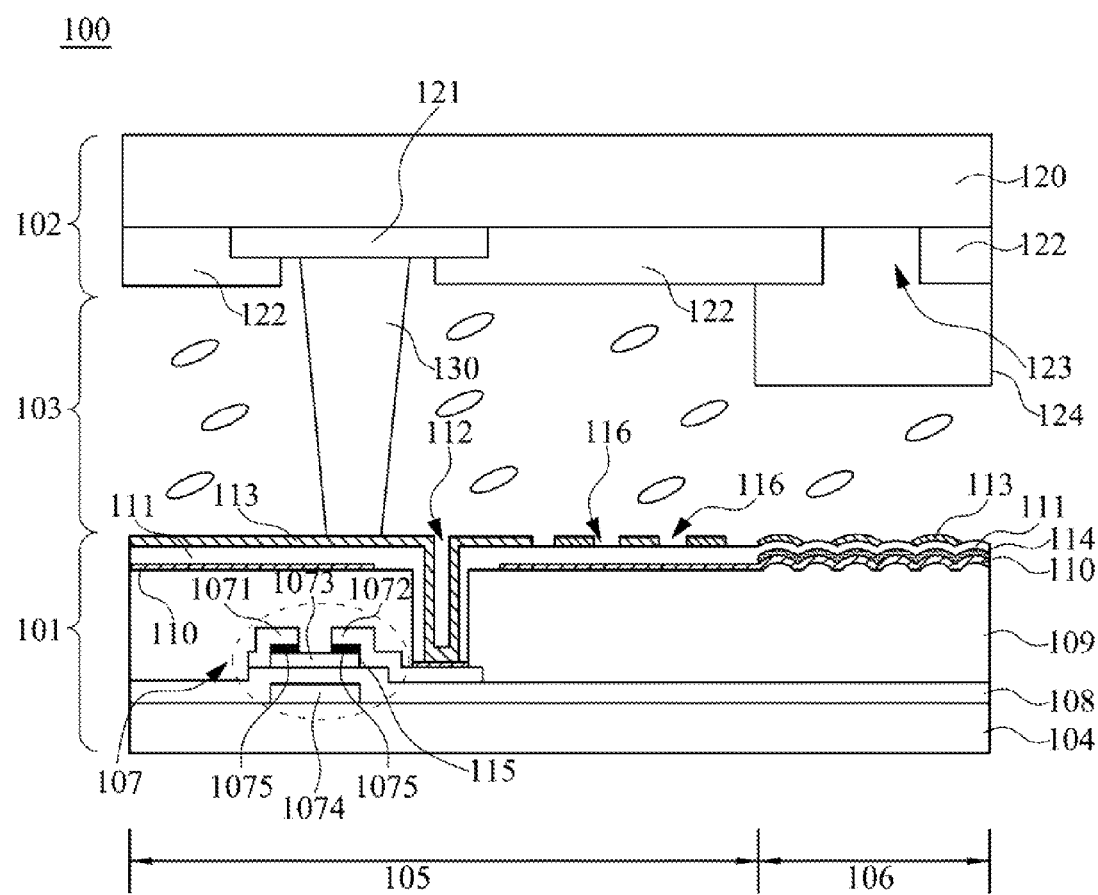
FIG. 1 is a cross-sectional diagram of a pixel of a transflective type liquid crystal display in accordance with an embodiment of the present invention.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a cross-sectional diagram of a pixel of a transflective type liquid crystal display in accordance with an embodiment of the present invention. Each pixel of the transflective type liquid crystal display includes a transmission region and a reflective region. In this embodiment, an In-Plan Switching (IPS) mode liquid crystal display structure is adopted to form the transmission region and the reflective region. According to the IPS mode liquid crystal display structure, both a common electrode and a pixel electrode are disposed on a thin film transistor array substrate. A transverse electric field is generated between the pixel electrode and the common electrode to drive a liquid crystal molecule layer. Because the transverse electric field drives liquid crystal molecules of the liquid crystal molecule layer to rotate on a plane, the viewing angle, contrast and parallax of the liquid crystal display are improved.

The transflective type liquid crystal display 100 includes a thin film transistor array substrate 101, and a color filter substrate 102 arranged parallel to the thin film transistor array substrate 101. A liquid crystal molecule layer 103 is filled between the thin film transistor array substrate 101 and the color filter substrate 102. A spacer 130 is also disposed between the thin film transistor array substrate 101 and the color filter substrate 102.

The thin film transistor array substrate 101 comprises a substrate 104 with a reflective region 106 and a transmission region 105. A thin film transistor 107 is disposed on the substrate 104. The thin film transistor 107 has a semiconductor layer 115. The semiconductor layer 115 comprises a source region 1071, a drain region 1072, a channel region 1073, two ohmic contact regions 1075, a gate insulation layer 108 and a gate region 1074. The source region 1071 and the drain region 1072 are disposed on two sides of the channel region 1073. The two ohmic contact regions 1075 are respectively disposed between the source region 1071 and the channel region 1073 and between the drain region 1072 and the channel region 1073. The gate region 1074 is disposed on the substrate 104 and corresponds to the channel region 1073. The gate insulation layer 108 covers the gate region 1074.

A first dielectric layer 109 is disposed on the thin film transistor 107. The first dielectric layer 109 has a through hole 112 to expose a part of the drain region 1072. A common electrode 110 is disposed on the first dielectric layer 109 and the through hole 112 to cover the exposed part of the drain region 1072. The common electrode 110 is extended in the transmission region 105 and the reflective region 106. A metal layer is disposed between the second dielectric layer 111 and the common electrode 110 in the reflective region 106 to act as a reflective electrode 114. The reflective electrode 114 is connected to the common electrode 110. A second dielectric layer 111 is disposed on the common electrode 110, the reflective electrode 114 and the sidewalls of the through hole 112. A pixel electrode 113 is disposed on the second dielectric layer 111. The pixel electrode 113 is connected to the drain region 1072 via the through hole 112. In this embodiment, the In-Plan Switching (IPS) mode liquid crystal display structure is adopted to form the transmission region 105 and the reflective region 106. Therefore, a plurality of openings 116 are formed in the pixel electrode 113. Accordingly, a transverse electric field is generated between the pixel electrode 113 and the common electrode 110 to drive the liquid crystal molecule layer 103.

The color filter substrate 102 comprises a substrate 120. A black matrix layer 121 and a color resist layer 122 are disposed on the substrate 120. The black matrix layer 121 is disposed on a position of the substrate 120 corresponding to the thin film transistor 107. The color resist layer 122 includes at least one opening 123 corresponding to the reflective region 106 to improve reflective efficiency. It is noted that in the transmission region 105, light only goes through the liquid crystal molecule layer 103 once, while in the reflective region 106, light passes through the liquid crystal molecule layer 103 twice. To ensure that the light passing through the reflective region 106 and the light passing through the transmission region 105 have the same intensity, and result in the same color reproduction, a transparent resist layer 124 is disposed on the color resist 122 in the reflective region 106 to form a dual cell gap structure.

FIG. 2a to FIG. 2h illustrate a method to form the transflective type liquid crystal display 100 in accordance with an embodiment of the present invention. The color filter substrate 102 may be formed by a conventional method. Therefore, the following paragraphs only describe the method to form the thin film transistor array substrate 101. Moreover, for illustrative purposes, only a pixel region is illustrated in FIG. 2a to FIG. 2h. (In FIG. 2a, a substrate 104 is provided. A transmission region 105 and a reflective region 106 are defined in the substrate 104. Subsequently, a first metal layer is formed on the substrate 104, and a gate region 1074 of a thin film transistor 107 is formed in the transmission region 105 by, for instance, performing a photolithography and etching process on the first metal layer.

Figure 2A:
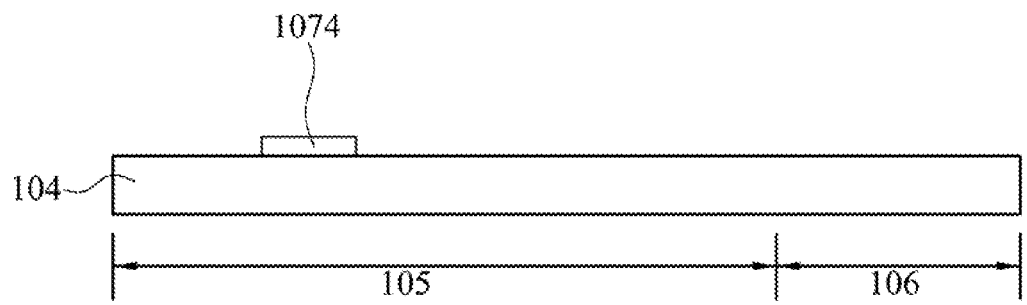
FIG. 2a to FIG. 2h illustrate a method to form the transflective type liquid crystal display in accordance with an embodiment of the present invention.
Figure 2B:
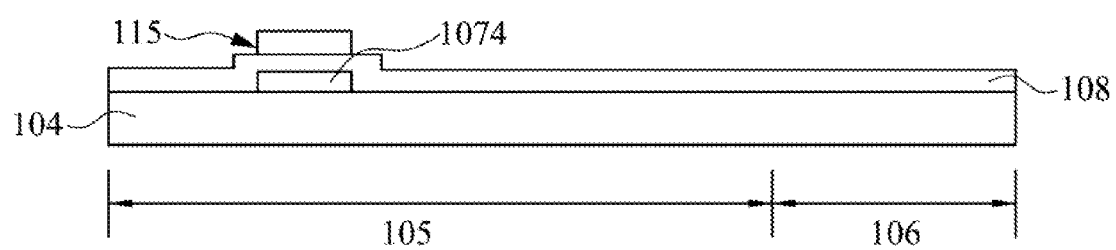
Figure 2C:
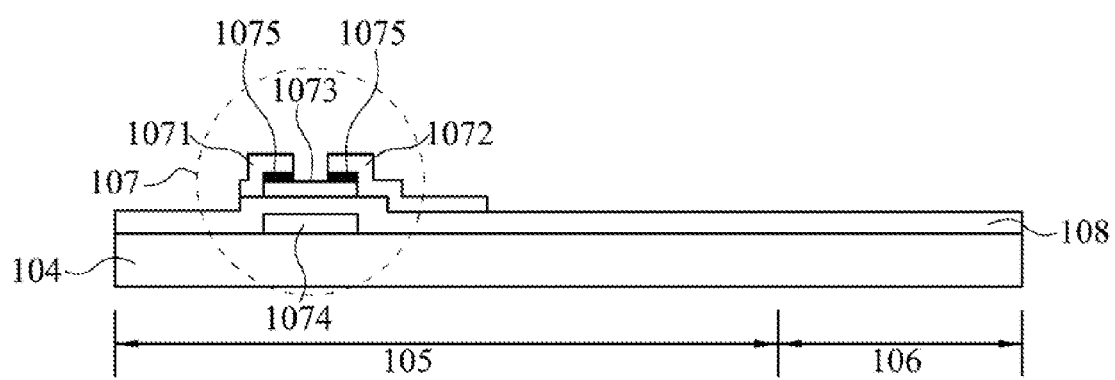

In FIG. 2b and FIG. 2c, a gate insulation layer 108 is formed on the substrate 104 covering the gate region 1074. Subsequently, an amorphous silicon layer is formed on the gate insulation layer 108 to form a semiconductor layer 115, and a channel region 1073, a source region 1071 and a drain region 1072 of the thin film transistor 107 are formed by, for instance, performing a photolithography and a doping process on the semiconductor layer 115. The non-doped region in the semiconductor layer 115 acts as the channel region 1073. The doped regions in the semiconductor layer 115 act as the source region 1071 and the drain region 1072. Two ohmic contacts 1075 are respectively formed in the source region 1071 and the drain region 1072. In an embodiment, the thin film transistor 107 may be an N-type thin film transistor or a P-type thin film transistor. Therefore, the dopant may be an N-type dopant or a P-type dopant. Moreover, in this embodiment, a single gate design is adopted to form the thin film transistor 107. However, in another embodiment, a dual gate design is adopted to form the thin film transistor 107. In FIG. 2c, a second metal layer is formed on the semiconductor layer 115, and connection electrodes are formed on the source region 1071 and the drain region 1072 by, for instance, performing a photolithography and etching process on the second metal layer.

Figure 2D:
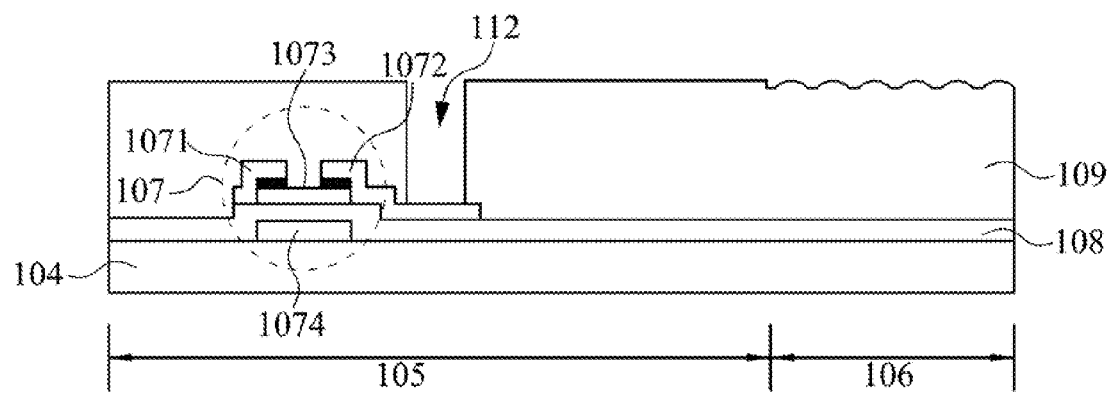

In FIG. 2d, a first dielectric layer 109 is formed on the thin film transistor 107. A waved surface is formed on the first dielectric layer 109 in the reflective region 106. Subsequently, a through hole 112 is formed in the first dielectric layer 109 to expose a part of the drain region 1072. In an embodiment, the first dielectric layer 109 is made of a material including silicon nitride (SiNx), silicon oxide (SiOx), silicon oxide nitride (SiOxNx), or a combination thereof. The first dielectric layer 109 may be a single layer or a stack of layers.

Figure 2E:
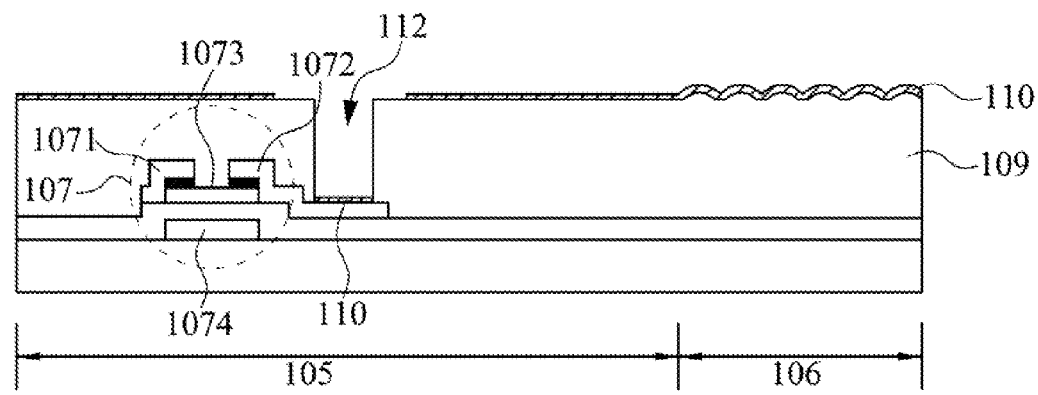

In FIG. 2e, a metal layer is formed on the first dielectric layer 109 and the through hole 112, and a common electrode 110 is formed by, for instance, performing a photolithography and etching process on the metal layer. The common electrode 110 is extended in the transmission region 105 and the reflective region 106. The common electrode 110 in the though hole 112 covers the exposed drain region 1072 to protect the drain region 1072. The common electrode 110 is made of a material including indium Tin oxide (ITO), indium zinc oxide (IZO), aluminum zinc oxide (AZO), or a combination thereof.

Figure 2F:
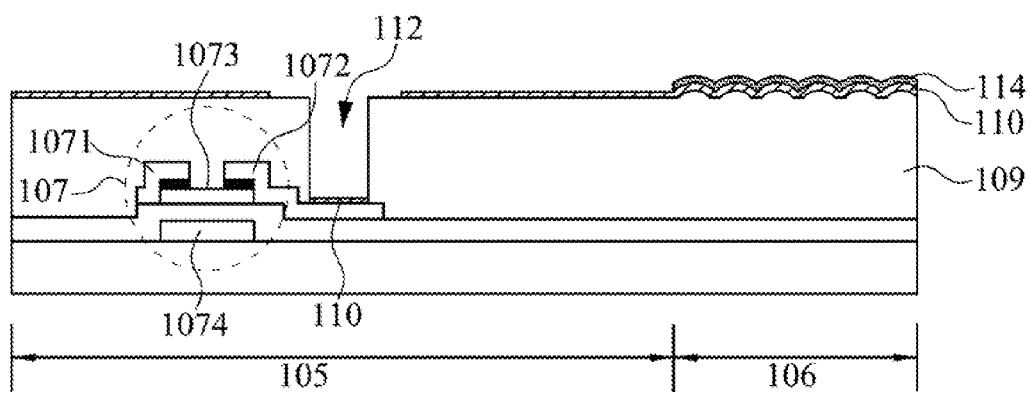

In FIG. 2f, a third metal layer is formed on the first dielectric layer 109 and the common electrode 110, and a reflective electrode 114 is formed in the reflective region 106 by, for instance, performing a photolithography and etching process on the third metal layer to remove a part of the third metal layer located in the transmission region 105.

Figure 2G:
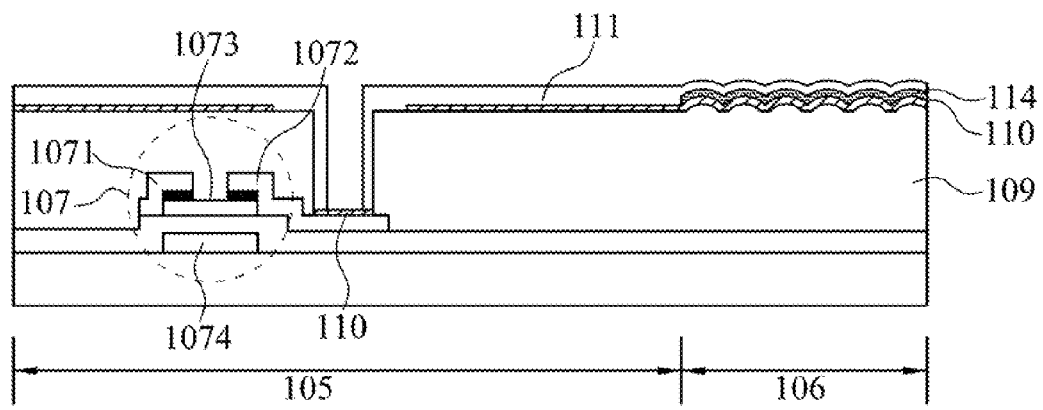

In FIG. 2g, a second dielectric layer 111 is formed on the first dielectric layer 109, the reflective electrode 114 and the common electrode 110 to act as a protection layer. In an embodiment, the second dielectric layer 111 is made of a material including silicon nitride (SiNx), silicon oxide (SiOx), silicon oxide nitride (SiOxNx), or a combination thereof. The first dielectric layer 109 may be a single layer or a stack of layers.

Figure 2H:
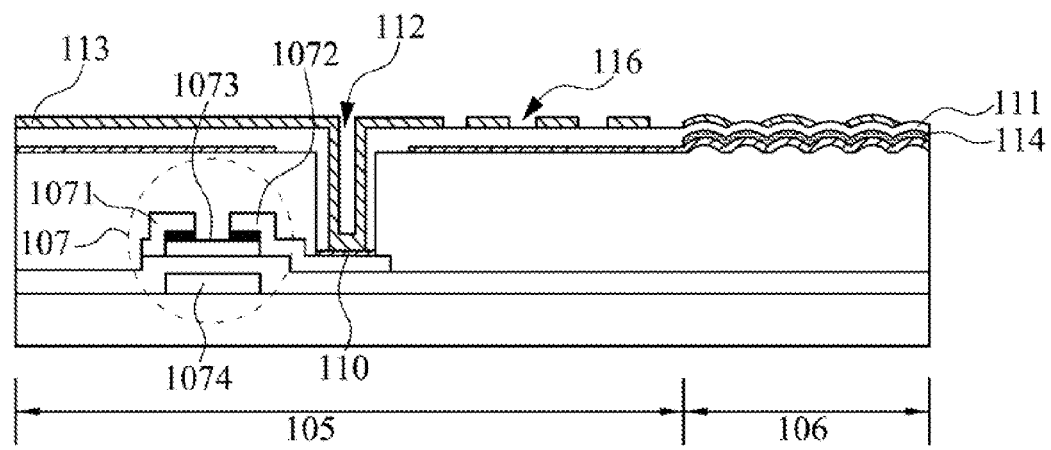

In FIG. 2h, a transparent conductive layer is formed on the second dielectric layer 111, and a pixel electrode 113 is formed by, for instance, performing a photolithography and etching process on the transparent conductive layer. The pixel electrode 113 is extended in the transmission region 105 and the reflective region 106. The pixel electrode 113 is connected to the drain region 1072 via the through hole 112. Because the In-Plan Switching (IPS) mode liquid crystal display structure is adopted to form the transmission region 105 and the reflective region 106, a plurality of openings 116 are formed in the pixel electrode 113. Accordingly, a transverse electric field is generated between the pixel electrode 113 and the common electrode 110 to drive the liquid crystal molecule layer 103.

Figure 3:
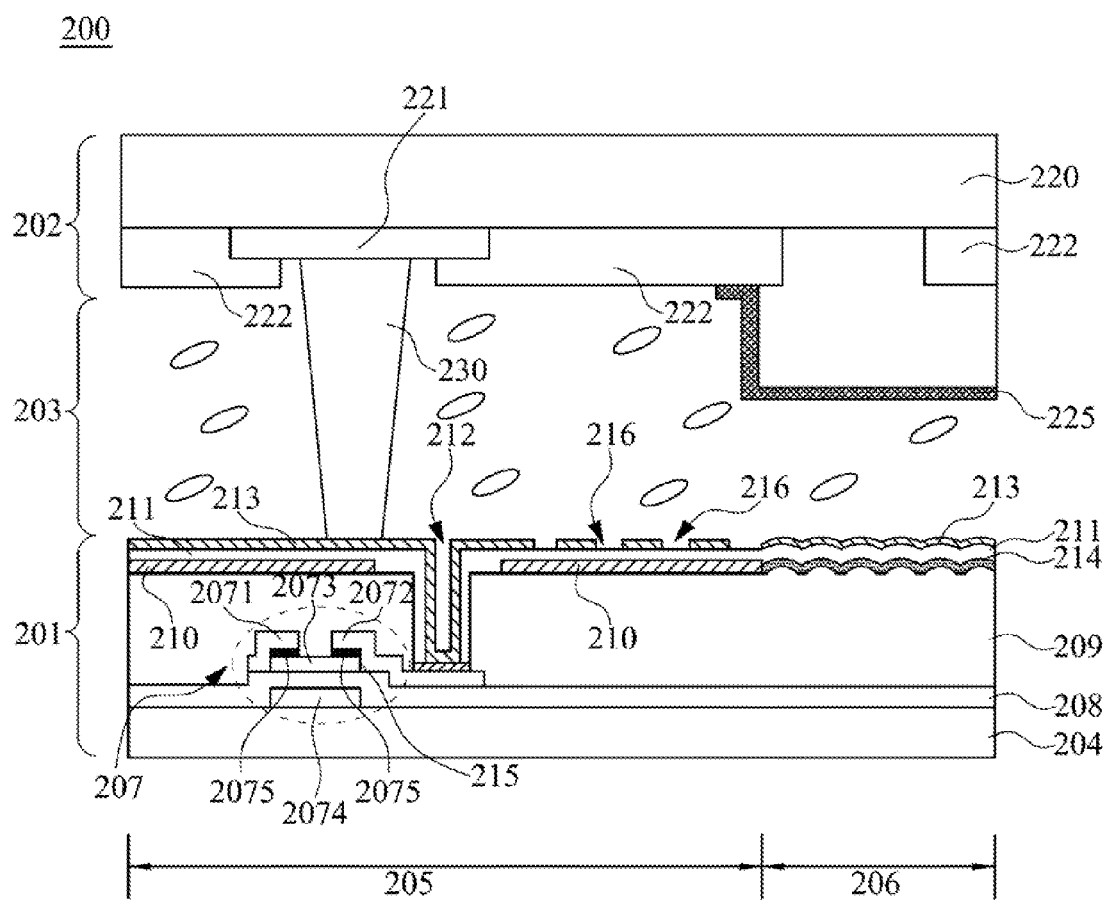
FIG. 3 is a cross-sectional diagram of a pixel of the transflective type liquid crystal display in accordance with another embodiment of the present invention.

FIG. 3 is a cross-sectional diagram of a pixel of the transflective type liquid crystal display in accordance with another embodiment of the present invention. Each pixel of the transflective type liquid crystal display includes a transmission region and a reflective region. In this embodiment, an In-Plan Switching (IPS) mode liquid crystal display structure is adopted to form the transmission region and an electrically controlled birefringence (ECB) mode liquid crystal display structure is adopted to form the reflective region.

The transflective type liquid crystal display 200 includes a thin film transistor array substrate 201, and a color filter substrate 202 arranged parallel to the thin film transistor array substrate 201. A liquid crystal molecule layer 203 is filled between the thin film transistor array substrate 201 and the color filter substrate 202. A spacer 230 is also disposed between the thin film transistor array substrate 201 and the color filter substrate 202.

The thin film transistor array substrate 201 comprises a substrate 204 with a reflective region 206 and a transmission region 205. A thin film transistor 207 is disposed on the substrate 204. The thin film transistor 207 has a semiconductor layer 215. The semiconductor layer 215 comprises a source region 2071, a drain region 2072, a channel region 2073, two ohmic contact regions 2075, a gate insulation layer 208 and a gate region 2074. The source region 2071 and the drain region 2072 are disposed on two sides of the channel region 2073. The two ohmic contact regions 2075 are respectively disposed between the source region 2071 and the channel region 2073 and between the drain region 2072 and the channel region 2073. The gate region 2074 is disposed on the substrate 204 and corresponds to the channel region 2073. The gate insulation layer 208 covers the gate region 2074.

A first dielectric layer 209 is disposed on the thin film transistor 207. The first dielectric layer 209 has a through hole 212 to expose a part of the drain region 2072. A common electrode 210 is disposed on the first dielectric layer 209 and the through hole 212 to cover the exposed part of the drain region 2072. The common electrode 210 is only extended in the transmission region 105. A reflective electrode 214 is disposed on the first dielectric layer 209 in the reflective region 206. In this embodiment, the reflective electrode 214 is connected to the common electrode 210. In another embodiment, the reflective electrode 214 is insulated from the common electrode 210. A second dielectric layer 211 is disposed on the common electrode 210, the reflective electrode 214 and the sidewalls of the through hole 212. A pixel electrode 213 is disposed on the second dielectric layer 211. The pixel electrode 213 is connected to the drain region 2072 via the through hole 212. In this embodiment, the In-Plan Switching (IPS) mode liquid crystal display structure is adopted to form the transmission region 205. Therefore, a plurality of openings 116 are formed in the pixel electrode 213 located in the transmission region 205. Accordingly, a transverse electric field is generated between the pixel electrode 213 and the common electrode 210 to drive the liquid crystal molecule layer 203. On the other hand, the electrically controlled birefringence (ECB) mode liquid crystal display structure is adopted to form the reflective region. There is no any opening formed in the pixel electrode 213 located in the reflective region 206. Accordingly, an electric field is generated between the pixel electrode 213 and the common electrode 225 disposed on the color filter substrate 202 to drive the liquid crystal molecule layer 203.

The color filter substrate 202 comprises a substrate 220. A black matrix layer 221 and a color resist layer 222 are disposed on the substrate 220. The black matrix layer 221 is disposed on a position of the substrate 220 corresponding to the thin film transistor 207. The color resist layer 222 includes at least one opening 223 corresponding to the reflective region 206 to improve reflective efficiency. Moreover, to ensure that the light passing through the reflective region 206 and the light passing through the transmission region 205 have the same intensity, and result in the same color reproduction, a transparent resist layer 224 is disposed on the color resist 222 in the reflective region 206 to form a dual cell gap structure. A common electrode 225 is disposed on the transparent resist layer 224 for cooperating with the pixel electrode 213 to generate an electric field to drive the liquid crystal molecule layer 203.

FIG. 4a to FIG. 4h illustrate a method to form the transflective type liquid crystal display 200 in accordance with another embodiment of the present invention. The color filter substrate 202 may be formed by a conventional method. Therefore, the following paragraphs only describe the method to form the thin film transistor array substrate 201. Moreover, for illustrative purposes, only a pixel region is illustrated in FIG. 4a to FIG. 4h.

Figure 4A:
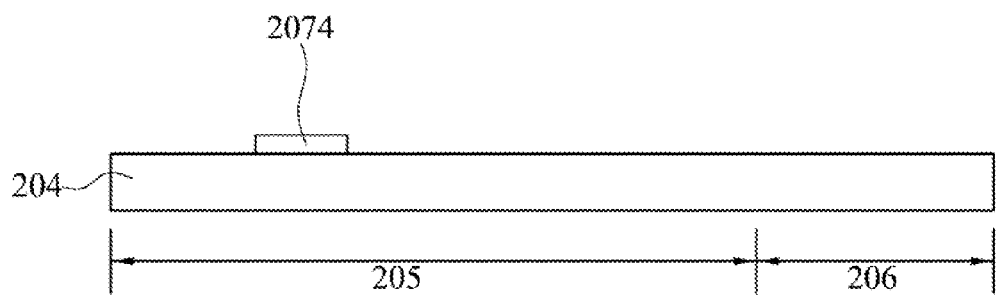
FIG. 4a to FIG. 4h illustrate a method to form the transflective type liquid crystal display in accordance with another embodiment of the present invention.

In FIG. 4a, a substrate 204 is provided. A transmission region 205 and a reflective region 206 are defined in the substrate 204. Subsequently, a first metal layer is formed on the substrate 204, and a gate region 2074 of a thin film transistor 207 is formed in the transmission region 205 by, for instance, performing a photolithography and etching process on the first metal layer.

Figure 4B:
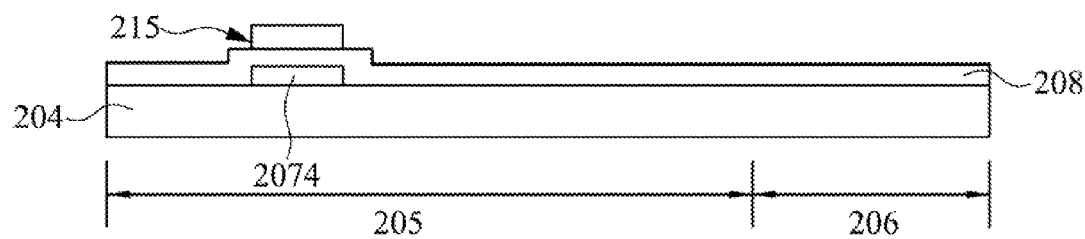
Figure 4C:
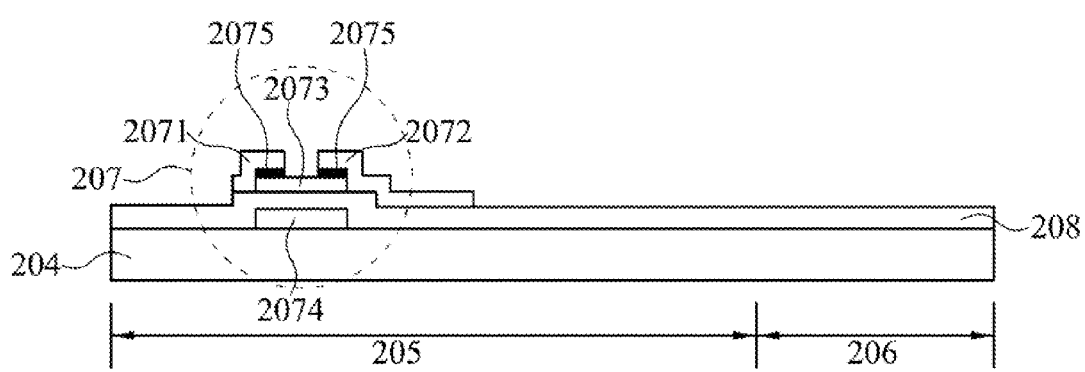

In FIG. 4b and FIG. 4c, a gate insulation layer 208 is formed on the substrate 204 covering the gate region 2074. Subsequently, an amorphous silicon layer is formed on the gate insulation layer 208 to form a semiconductor layer 215, and a channel region 2073, a source region 2071 and a drain region 2072 of the thin film transistor 207 are formed by, for instance, performing a photolithography and a doping process on the semiconductor layer 215. The non-doped region in the semiconductor layer 215 acts as the channel region 2073. The doped regions in the semiconductor layer 215 act as the source region 2071 and the drain region 2072. Two ohmic contact regions 2075 are also respectively disposed between the source region 2071 and the channel region 2073 and between the drain region 2072 and the channel region 2073. In an embodiment, the thin film transistor 207 may be an N-type thin film transistor or a P-type thin film transistor. Therefore, the dopant may be an N-type dopant or a P-type dopant. Moreover, in this embodiment, a single gate design is adopted to form the thin film transistor 207. However, in another embodiment, a dual gate design is also adopted to form the thin film transistor 207. In FIG. 4c, a second metal layer is formed on the semiconductor layer 215, and connection electrodes are formed on the source region 2071 and the drain region 2072 by, for instance, performing a photolithography and etching process on the second metal layer.

Figure 4D:
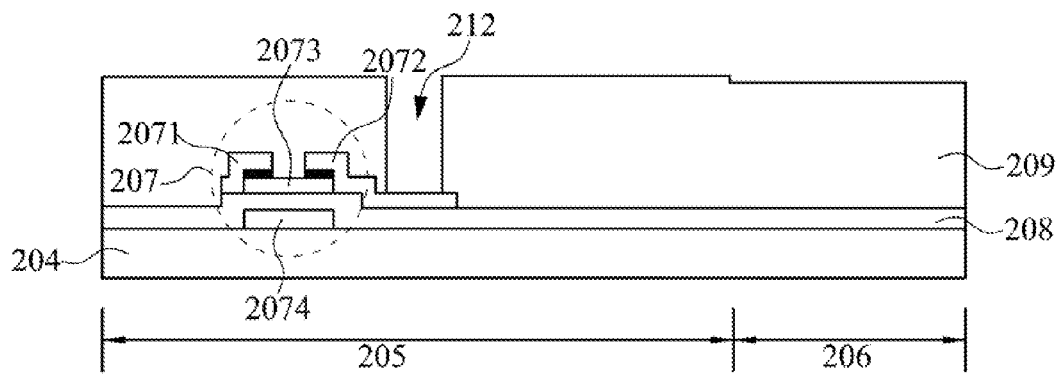

In FIG. 4d, a first dielectric layer 209 is formed on the thin film transistor 207. A waved surface is formed on the first dielectric layer 209 in the reflective region 206. Subsequently, a through hole 212 is formed in the first dielectric layer 209 to expose a part of the drain region 2072. In an embodiment, the first dielectric layer 209 is made of a material including silicon nitride (SiNx), silicon oxide (SiOx), silicon oxide nitride (SiOxNx), or a combination thereof. The first dielectric layer 209 may be a single layer or a stack of layers.

Figure 4E:
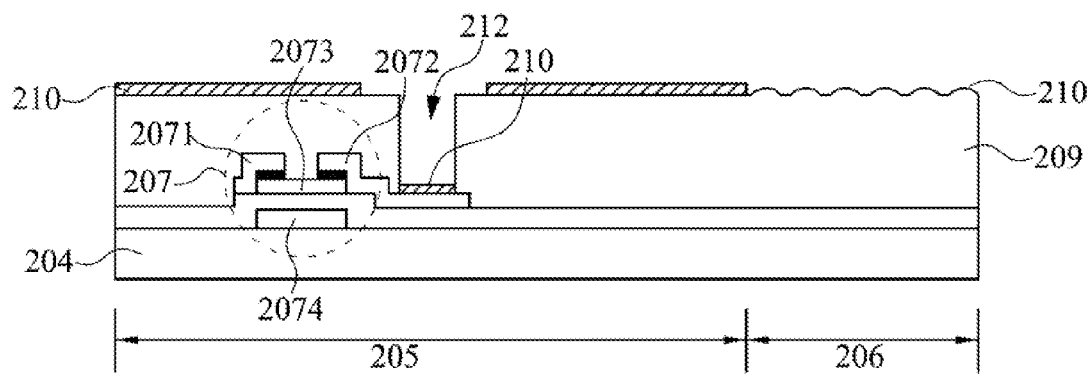

In FIG. 4e, a metal layer is formed on the first dielectric layer 209 and the through hole 212, and a common electrode 210 is formed by, for instance, performing a photolithography and etching process on the metal layer to remove the metal layer located in the reflective region 205. Therefore, in this embodiment, the common electrode 210 is only extended in the transmission region 205. The common electrode 210 in the though hole 212 covers the exposed drain region 2072 to protect the drain region 2072. The common electrode 210 is made of a material including indium Tin oxide (ITO), indium zinc oxide (IZO), aluminum zinc oxide (AZO), or a combination thereof.

Figure 4F:
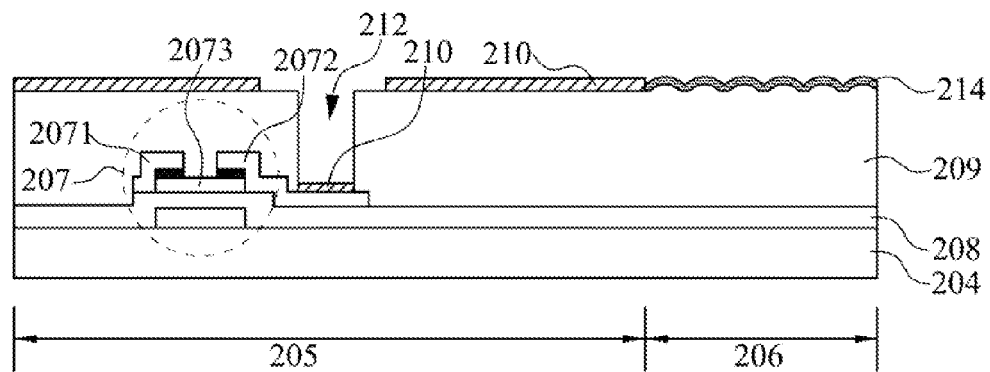

In FIG. 4f, a third metal layer is formed on the first dielectric layer 209 and the common electrode 210, and a reflective electrode 214 is formed in the reflective region 206 by, far instance, performing a photolithography and etching process on the third metal layer to remove a part of the third metal layer located in the transmission region 205. In this embodiment, the reflective electrode 214 is connected to the common electrode 210. However, in another embodiment, the reflective electrode 214 is insulated form the common electrode 210.

Figure 4G:
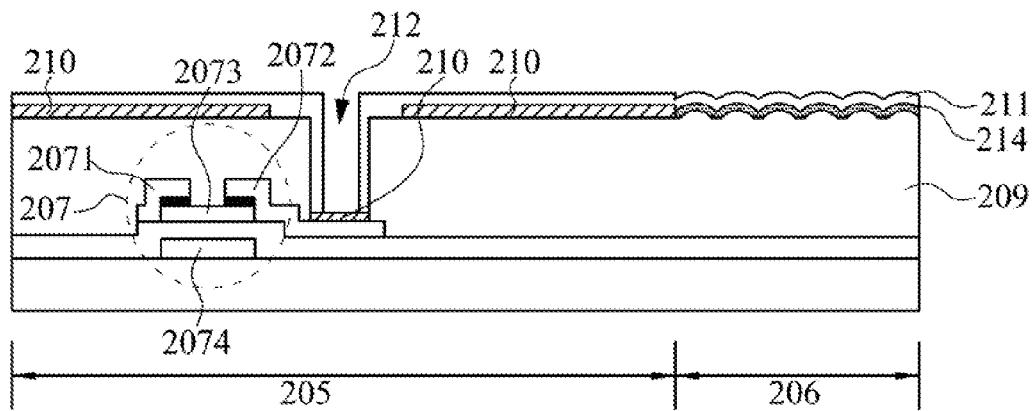

In FIG. 4g, a second dielectric layer 211 is formed on the first dielectric layer 209, the reflective electrode 214 and the common electrode 210 to act as a protection layer. In an embodiment, the second dielectric layer 211 is made of a material including silicon nitride (SiNx), silicon oxide (SiOx), silicon oxide nitride (SiOxNx), or a combination thereof. The first dielectric layer 209 may be a single layer or a stack of layers.

Figure 4H:
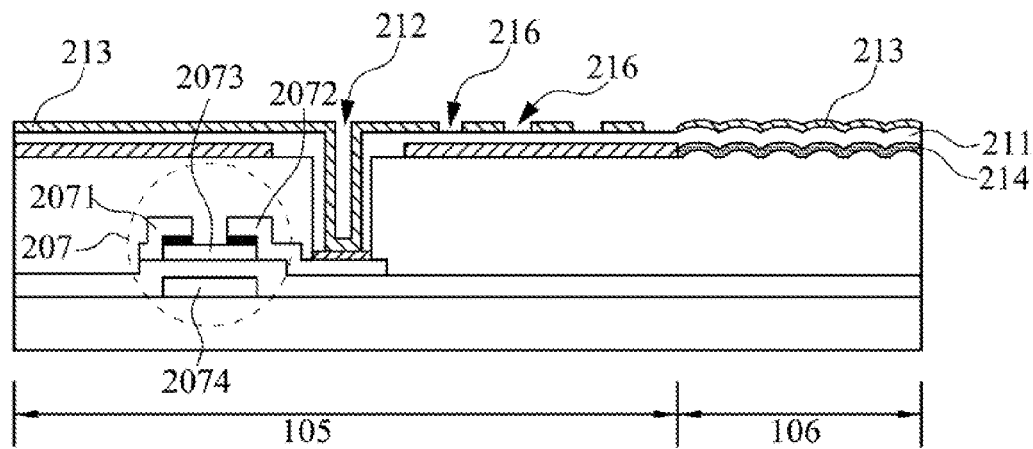

In FIG. 4h, a transparent conductive layer is formed on the second dielectric layer 211, and a pixel electrode 213 is formed by, for instance, performing a photolithography and etching process on the transparent conductive layer. The pixel electrode 213 is extended in the transmission region 205 and the reflective region 206. The pixel electrode 213 is connected to the drain region 2072 via the through hole 212. Because the In-Plan Switching (IPS) mode liquid crystal display structure is adopted to form the transmission region 205, a plurality of openings 216 are formed in the pixel electrode 213. Accordingly, a transverse electric field is generated between the pixel electrode 213 and the common electrode 210 to drive the liquid crystal molecule layer 203. On the other hand, the electrically controlled birefringence (ECB) mode liquid crystal display structure is adopted to form the reflective region 206. No opening is formed in the pixel electrode 213 located in the reflective region 206. Accordingly, an electric field is generated between the pixel electrode 213 and the common electrode 225 disposed on the color filter substrate 202 to drive the liquid crystal molecule layer 203. It is noted that, in the above embodiments, the IPS mode or the ECB mode liquid crystal display structure is adopted to form the reflective region 206. However, in another embodiment, liquid crystal display structures of other modes may be adopted to form the reflective region 206 to cooperate with the transmission region 205 having the IPS mode liquid crystal display structure.

Accordingly, an IPS mode liquid crystal display structure is adopted to form the transmission region. Therefore, a transverse electric field is generated between the pixel electrode and the first common electrode in the transmission region of the transflective type liquid crystal display, so that the viewing angle is enhanced.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. A transflective type liquid crystal display, comprising:
 a thin film transistor disposed on a first substrate, wherein the first substrate has a reflective region and a transmission region, and the thin film transistor has a channel region, a source region, a drain region and a gate region;
 a first dielectric layer disposed on the thin film transistor, wherein the first dielectric layer has a through hole to expose a part of the drain region;
 a first common electrode disposed on the first dielectric layer and the through hole to cover the exposed part of the drain region;
 a reflective electrode disposed on the first dielectric layer located in the reflective region;
 a second dielectric layer disposed on the first common electrode, the reflective electrode and sidewalls of the through hole; and a pixel electrode disposed on the second dielectric layer, wherein the pixel electrode is connected to the drain region via the through hole.

2. The transflective type liquid crystal display of claim 1, wherein the thin film transistor further comprises:
    a first metal layer disposed on the transmission region;
    an insulation layer disposed on the first metal layer and the first substrate; and
    a semiconductor layer disposed on the insulation layer at a position of the insulation layer corresponding to the first metal layer, wherein the semiconductor layer comprises the source region, the drain region and the channel region located between the source region and the drain region, and the first metal layer comprises the gate region.

3. The transflective type liquid crystal display of claim 1, further comprising:
    a second substrate facing the first substrate; and
    a liquid crystal molecule layer disposed between the first substrate and the second substrate, wherein a color resist layer is disposed on the second substrate, and an opening is formed in the color resist layer at a position of the color resist layer corresponding to the reflective region.

4. The transflective type liquid crystal display of claim 3, wherein the first common electrode is extended in the reflective region and the transmission region, and the reflective electrode is disposed on the first common electrode located in the reflective region.

5. The transflective type liquid crystal display of claim 4, wherein the pixel electrode has a plurality of openings, and a transverse electric field is generated between the pixel electrode and the first common electrode to drive the liquid crystal molecule layer in the transmission region and the reflective region.

6. The transflective type liquid crystal display of claim 3, wherein the second substrate further comprises a second common electrode, and the second common electrode is disposed on the color resist layer corresponding to the reflective region.

7. The transflective type liquid crystal display of claim 6, wherein the first common electrode is only disposed on the transmission region, and the reflective electrode is disposed on the first dielectric layer in the reflective region, wherein the reflective electrode is connected to or insulated from the first common electrode.

8. The transflective type liquid crystal display of claim 6, wherein the pixel electrode in the transmission region has a plurality of openings, and a transverse electric field is generated between the pixel electrode and the first common electrode to drive the liquid crystal molecule layer in the transmission region.

9. The transflective type liquid crystal display of claim 6, wherein an electric field is generated between the pixel electrode and the second common electrode to drive the liquid crystal molecule layer in the reflective region.

10. A method for forming a transflective type liquid crystal display, comprising:
    providing a first substrate with a reflective region and a transmission region;
    forming a thin film transistor in the transmission region, wherein the thin film transistor has a channel region, a source region, a drain region and a gate region;
    forming a first dielectric layer on the thin film transistor, wherein the first dielectric layer has a through hole to expose a part of the drain region;
    forming a first common electrode on the first dielectric layer and the through hole to cover the exposed part of the drain region;
    forming a reflective electrode on the first dielectric layer located in the reflective region;
    forming a second dielectric layer on the first common electrode, the reflective electrode and sidewalls of the through hole; and
    forming a pixel electrode on the second dielectric layer, wherein the pixel electrode is connected to the drain region via the through hole.

* * * * *